US009686768B2

United States Patent
Palanki

(10) Patent No.: US 9,686,768 B2
(45) Date of Patent: *Jun. 20, 2017

(54) UTILIZING MOTION DETECTION IN ESTIMATING VARIABILITY OF POSITIONING RELATED METRICS

(71) Applicant: QUALCOMM Incorporated, San Diego, CA (US)

(72) Inventor: Ravi Palanki, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/093,432

(22) Filed: Apr. 7, 2016

(65) Prior Publication Data

US 2016/0219550 A1   Jul. 28, 2016

Related U.S. Application Data

(63) Continuation of application No. 13/928,107, filed on Jun. 26, 2013, now Pat. No. 9,357,354.

(51) Int. Cl.
*H04W 24/00* (2009.01)
*H04B 1/38* (2015.01)
(Continued)

(52) U.S. Cl.
CPC .......... *H04W 64/00* (2013.01); *G01S 5/0205* (2013.01); *G01S 5/14* (2013.01); *H04W 4/027* (2013.01); *G01S 5/0278* (2013.01)

(58) Field of Classification Search
CPC ................. H04W 64/00; H04W 4/02
(Continued)

(56) References Cited

U.S. PATENT DOCUMENTS 6,147,644 A * 11/2000 Castles .............. H04B 7/18547
342/357.55
6,456,237 B1   9/2002 Ruutu et al.
(Continued)

FOREIGN PATENT DOCUMENTS

WO   WO-2009131506 A1   10/2009
WO   WO-2010059934 A2   5/2010
(Continued)

OTHER PUBLICATIONS

3GPP Draft, Siemens: "Introduction of Rx Timing Deviation measurement for TDD for locations services", R3-001484. 3rd Generation Partnership Project (3GPP), Mobile Competence Centre; 650, Route Des Lucioles; F-06921 Sophia-Antipolis Cedex; France, vol. RAN WG3, No. Hawaii, USA; 20000601, XP050147207, Jun. 1, 2000 (Jun. 1, 2000), 16 pages.
(Continued)

*Primary Examiner* — Dung Hong
(74) *Attorney, Agent, or Firm* — Silicon Valley Patent Group LLP

(57) ABSTRACT

Systems, apparatus and methods disclosed herein utilize motion detection to estimate variability of positioning related metrics. In some embodiments, a method may comprise obtaining the speeds of a plurality of mobile stations in a set of mobile stations connected to an AP in a wireless network. The frequency of Round Trip Time (RTT) measurements between a mobile station in the plurality of mobile stations and the AP is increased during periods when the speed of the mobile station does not exceed a threshold. An estimate of variability may be obtained for RTT measurements for the AP.

32 Claims, 8 Drawing Sheets

(51) Int. Cl.
*H04M 11/04* (2006.01)
*H04B 1/04* (2006.01)
*H04W 64/00* (2009.01)
*H04W 4/02* (2009.01)
*G01S 5/02* (2010.01)
*G01S 5/14* (2006.01)

(58) Field of Classification Search
USPC .................... 455/404.2, 456.1, 456.5, 456.6
See application file for complete search history.

(56) References Cited

U.S. PATENT DOCUMENTS

| | | | |
|---|---|---|---|
| 6,681,099 B1 | 1/2004 | Keranen et al. | |
| 7,653,713 B2 | 1/2010 | Han et al. | |
| 8,036,679 B1* | 10/2011 | Barbeau | H04W 4/02 340/539.13 |
| 8,345,531 B2 | 1/2013 | De Pasquale et al. | |
| 8,768,344 B2 | 7/2014 | Naguib et al. | |
| 8,781,492 B2 | 7/2014 | Das et al. | |
| 2005/0005207 A1* | 1/2005 | Herneque | H04L 47/10 714/712 |
| 2007/0002813 A1 | 1/2007 | Tenny et al. | |
| 2010/0135178 A1* | 6/2010 | Aggarwal | G01S 5/0205 370/252 |
| 2010/0216509 A1* | 8/2010 | Riemer | H04M 1/72577 455/557 |
| 2011/0039573 A1 | 2/2011 | Hardie | |
| 2011/0159884 A1* | 6/2011 | Chawla | H04W 52/0254 455/456.1 |
| 2012/0046045 A1* | 2/2012 | Gupta | G01S 5/0252 455/456.1 |
| 2012/0264447 A1* | 10/2012 | Rieger, III | G01S 5/0252 455/456.1 |
| 2012/0295642 A1 | 11/2012 | Takahashi et al. | |
| 2014/0094192 A1* | 4/2014 | Annett | H04W 64/00 455/456.3 |
| 2015/0005016 A1 | 1/2015 | Palanki | |

FOREIGN PATENT DOCUMENTS

| | | |
|---|---|---|
| WO | WO-2010075369 | 7/2010 |
| WO | WO-2011137396 | 11/2011 |
| WO | WO-2013077791 A1 | 5/2013 |

OTHER PUBLICATIONS

International Search Report and Written Opinion—PCT/US2014/043933—ISA/EPO—Jan. 9, 2015.
Discussion on a Data Fusion Method of Wireless Location Based on Double Time Difference of Arrival, Dec. 31, 2009.
Zheng-Hua M.A., et al., "New Wireless Location Scheme Based on Frequency Deviation Elimination," Journal of Changzou University (Natural Science Edition) Jan. 2013, vol. 25(1), 5 pages.

* cited by examiner

UTILIZING MOTION DETECTION IN ESTIMATING VARIABILITY OF POSITIONING RELATED METRICS

CROSS REFERENCE TO RELATED APPLICATIONS

This application is a continuation of U.S. application Ser. No. 13/928,107 entitled "Utilizing Motion Detection In Estimating Variability Of Positioning Related Metrics," filed Jun. 26, 2013, which is incorporated by reference in its entirety herein.

FIELD

The subject matter disclosed herein relates to the determination of mobile station locations.

BACKGROUND

In network based positioning ("NBP") systems, the locations of mobile stations ("MS"), which may be equipped with Wi-Fi and/or Satellite Positioning System ("SPS") capabilities, can be computed based on a variety of metrics. SPS' such as the Global Positioning System (GPS) or the Global Navigation Satellite System (GNSS) work well in outdoor environments. However, GPS is often less effective within a building, or in many urban environments due to signal losses. Thus, Radio Frequency ("RF") communications capabilities of the MS are often used to determine MS locations in indoor environments.

In NBP systems, various metrics related to an MS' RF communications capabilities may be measured and used to determine the location of the MS. For example, the metrics measured may include signal Round Trip Time ("RTT"), Received signal strength indicator ("RSSI"), etc. In traditional NBP systems, when RTT or other metrics are used to determine MS location, variability in the metric measurements may contribute to inaccuracies or inconsistencies in MS location estimation.

Therefore, there is a need for systems and methods to maintain consistency in the quality of service, and enhance the accuracy and reliability of location estimations provided by NBP positioning systems.

SUMMARY

In some embodiments, a processor-implemented method may comprise obtaining a speed of a Mobile Station (MS) in a plurality of mobile stations in communication with an Access Point (AP) in a wireless network; and initiating an increase in a frequency of Round Trip Time (RTT) measurements between the MS and the AP during periods when the speed of the MS does not exceed a threshold.

Further, in some embodiments, an apparatus may comprise: a memory and a processor coupled to the memory, wherein the processor is configured to: obtain a speed of a Mobile Station (MS) in communication with a wireless network; and initiate an increase in a frequency of Round Trip Time (RTT) measurements between the MS and an Access Point (AP) coupled to the wireless network during a period when the speed of the MS does not exceed a threshold.

In a further embodiment, an apparatus may comprise: means for obtaining a speed of a Mobile Station (MS) in communication with a wireless network; and means for initiating an increase in a frequency of Round Trip Time (RTT) measurements between the MS and an Access Point (AP) coupled to the wireless network during periods when the speed of the MS does not exceed a threshold.

Additional embodiments also pertain to a non-transitory computer-readable medium comprising instructions, which when executed by a processor, perform steps in a method comprising: obtaining a speed of a Mobile Station (MS) in a plurality of mobile stations in communication with an Access Point (AP) in a wireless network; and initiating an increase in a frequency of Round Trip Time (RTT) measurements between the MS and the AP during periods when the speed of the MS does not exceed a threshold.

Disclosed embodiments also pertain to apparatuses, systems, and computer-readable media embodying instructions to perform the above methods.

DETAILED DESCRIPTION

The detailed description set forth below in connection with the appended drawings is intended as a description of some exemplary non-limiting embodiments and various other embodiments may be practiced and are envisaged as would be apparent to one of skill in the art. Embodiments described are provided merely as examples or illustrations of the present disclosure. The detailed description includes specific details for the purpose of providing a thorough understanding of the present disclosure. However, it will be apparent to those skilled in the art that the present disclosure may be practiced without one or more of these specific details. In some instances, well-known structures and devices are not shown in block diagram form in order to avoid obscuring the concepts of the present disclosure. Acronyms and other descriptive terminology may be used merely for convenience and clarity and are not intended to limit the scope of the disclosure.

Techniques described herein may be implemented in conjunction with various wireless networks, including wireless communication networks such as a wireless local area network (WLAN), a wireless personal area network (WPAN), wireless wide area network (WWAN) and so on.

In referring to the process of determining the location of an MS using a positioning system, the terms location estimation, geo-location, locating and positioning are often used interchangeably.

Figure 1A:
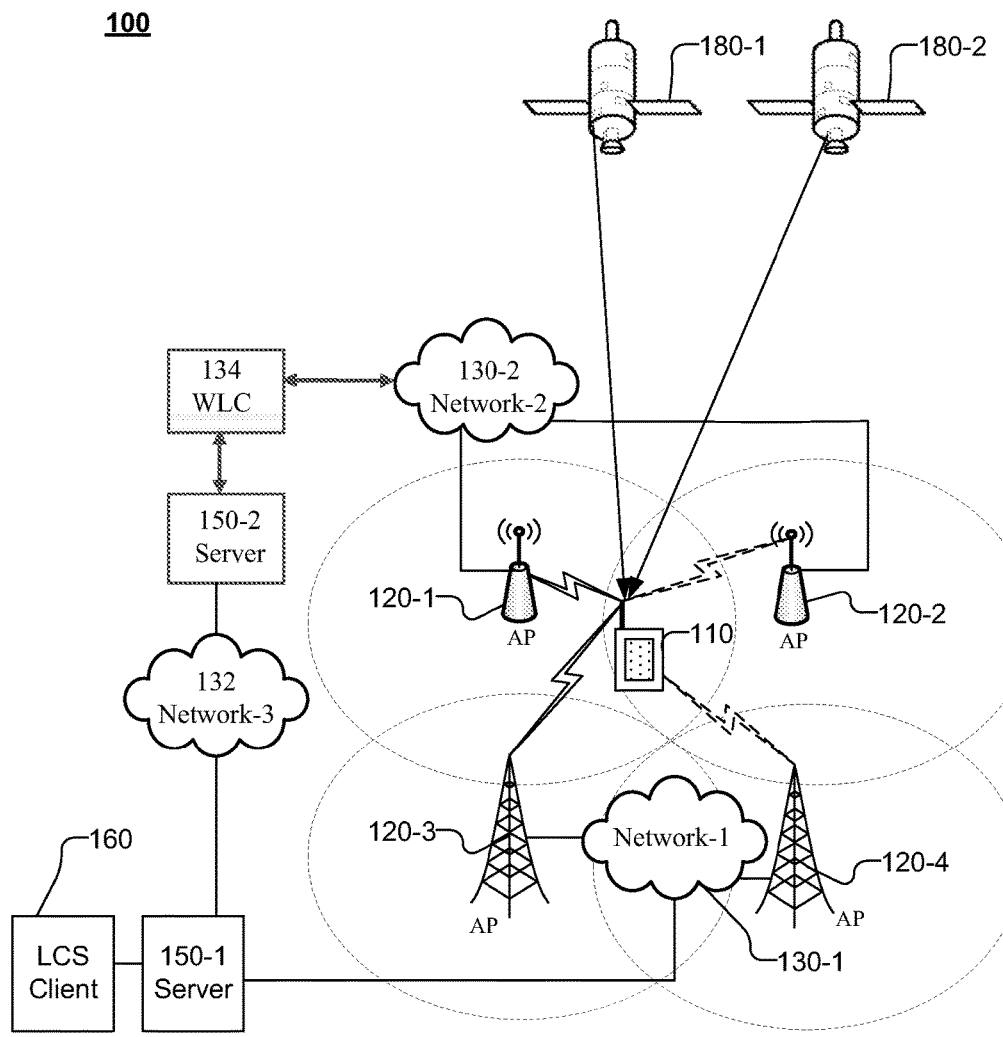
FIG. 1A shows an architecture illustrating an exemplary system capable of providing Location Services to Mobile Stations (MS) including the transfer of capability information, location assistance data and/or location related information.

FIG. 1A shows an architecture illustrating an exemplary system 100 capable of providing Location Services to Mobile Stations (MS) including the transfer of location assistance data or location information. As shown in FIG. 1, exemplary Mobile Station 110 may be capable of communicating with Satellite Vehicles (SVs) 180-1 and/or 180-2 (collectively sometimes referred to as SVs 180) and wireless networks 130-1 and 130-2 (collectively sometimes referred to as networks 130).

For example, communication with wireless network 130-2, which, in some instances, may be a Wireless Local Area Network (WLAN), may occur through Access Points (APs) 120-1 or 120-2 which may take the form of various wireless access points such as Wi-Fi access points, wireless access terminals, IEEE 802.11x standard complaint access points, a WLAN access point, Wireless Personal Area Network (WPAN) access point, etc. As a further example, communication with wireless network 130-1, which, in some instances, may take the form of cellular network 130-1, may occur though APs 120-3 or 120-4, which may be Node Bs, Base Transceiver Stations (BTS), evolved Node B's (eNode B), femtocell access points, Home Node Bs, Home Base Station Access Points etc. In general, the term "Access Point" as used herein is used to refer to any wireless network entity that is capable of direct wireless communication with MS 110. APs 120-1, 120-2, 120-3, and 120-4 are collectively sometimes referred to as APs 120.

For simplicity, only one mobile station 110 is shown in FIG. 1, although, in practice, several mobile stations may be concurrently communicating with one or more of SVs 180 and/or various network entities through exemplary wireless networks 130 and/or wired network 132. In general, system 100 may consist of some combination of wired networks 132 and/or wireless networks 130 and a plurality of mobile stations 110, which may be capable of communicating with one or more entities coupled to the networks. Each of the plurality of mobile stations 110 may be uniquely identified in a wireless network through its MAC address and/or another MS identifier such as an International MS Equipment Identity (IMEI) number and/or an International/Temporary Mobile Subscriber Identity (IMSI/TMSI) number.

As used herein, the term "mobile station" refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

Also, "mobile station" is intended to include all wireless communication devices, which are capable of communication with a server, such as via the Internet, WiFi, cellular wireless network, Digital Subscriber Line (DSL) network, packet cable network or other network, and regardless of whether assistance data reception, and/or position-related processing occurs at the device, at a server, or at another device associated with the network. Any operable combination of the above are also considered a "mobile station." MS 110 may be capable of wirelessly communicating with one or more servers (such as servers 150-1 and 150-2) through one or more networks (such as networks 130 and/or 132).

MS 110 may support positioning and location services, which may include, but are not limited to, the Secure User Plane Location (SUPL) location solution defined by a body called the "Open Mobile Alliance" (OMA) and the Control Plane location solution defined by a consortium named "3rd Generation Partnership Project" (3GPP) for use with an Long Term Evolution (LTE) serving network. For example, Location services (LCS) may be performed on behalf of exemplary LCS Client 160 that accesses location server 150-1 and issues a request for the location of MS 110 and receives back from location server 150-1 a location estimate for MS 110. LCS Client 160 may also be known as a SUPL Agent—e.g. when the location solution used by location server 150-1 and MS 110 is SUPL. MS 110 may also include an LCS Client or a SUPL agent (not shown in FIG. 1) that may issue a location request to some positioning capable function within MS 110 and later receive back a location estimate for MS 110. Server 150-1 may be a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

As illustrated in FIG. 1, MS 110 may communicate with a server 150-1 through network 130-1 through APs 120-3 and/or 120-4, which are associated with network 130-1. MS 110 may also communicate with server 150-2 through network 130-2 and APs 120-1 and/or 120-2. In some embodiments, servers 150-1 and 150-2 may also be able to communicate through network 132. Further, an application on MS 110 may send information addressed to server 150-1 using APs 120-1 or 120-2, server 150-2, and networks 130-2 and 132. In some embodiments, communication between MS 110 and servers 150 may pertain to information related to the location of MS 110 and/or metrics that may be related to location determination of MS 110. For example, MS 110 may receive the cell identifier for a serving cell, location information and/or location assistance information over one or more of networks 130.

MS 110 may also measure various metrics associated with signals transmitted by APs 120, process the measured metrics, and send the raw and/or processed metrics information over networks 130 to one of servers 150. For example, MS 110 may measure parameters or metrics associated with signals received at MS 110 from APs 120 and/or SVs 180. In some embodiments, the metrics may be used by MS 110 and/or another network entity for location determination or to provide assistance data for location determination of MS 110.

In some embodiments, the metrics measured may include, without limitation, for example, Round Trip Time ("RTT"), and/or Received signal strength indicator ("RSSI"). RTT is a measure of the round-trip time duration starting at the time a signal is transmitted to an entity, such as MS 110, to the time that an acknowledgment for the transmitted signal is received by the sender from the entity, for example, from MS 110.

RSSI is a measure of the power present in a received radio signal. RSSI values may be used by MS 110, for example, to decide which AP 120 to use at a given time. For example, MS 110 may connect to one or more APs 120 with the strongest RSSI at a given time. The AP currently connected to MS 110 is termed the serving AP. If an AP 120-i, is the access point for a cellular network then the cell to which MS 110 is connected through the AP 120 is termed the serving cell. For example, in FIG. 1, MS 110 may be simultaneously connected to AP 120-1 (which may be associated with a WLAN) and AP 120-3 (which may be associated with a first cell) at a first time. MS 110 may then switch from AP 120-1 to AP 120-2 at a later time, if measured RSSI value for a signal associated with AP 120-2 exceeds the RSSI value of a signal associated with AP 120-1. Further, at a subsequent time, MS 110 may switch from AP 120-3 to AP 120-4 (which may be associated with a second cell) if the measured RSSI value for a signal associated with AP 120-4 exceeds that of a signal associated with AP 120-3.

MS 110 and/or servers 150 may also compute the position of MS 110 through trilateration of the RTT/RSSI measurements from multiple APs 120 and/or various other appropriate methods. In some embodiments, parameters associated with received signals may be measured when RSSI is above some RSSI strength value. For example, in one embodiment, RTT measurements may be undertaken when the RSSI values associated with entities transmitting the signal(s) exceeds an RSSI strength level. In some embodiments, the RSSI strength level may be set to ensure accurate and/or reliable metric measurements. In some embodiments, MS 110 and/or APs 120 may be configured to measure and/or to report measured RSSI and/or RTT values to servers 150.

In some embodiments, APs 120 may form part of a wireless communication network, which may be a wireless wide area network (WWAN), wireless local area network (WLAN), a wireless personal area network (WPAN), and so on. In the context of wireless communication, the term "wireless communication network" and "wireless communication system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents available from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. For example, APs 120 and networks 130 may form part of, e.g., an evolved UMTS Terrestrial Radio Access Network (E-UTRAN) (LTE) network, a W-CDMA UTRAN network, a GSM/EDGE Radio Access Network (GERAN), a 1x RTT network, an Evolution-Data Optimized (EvDO) network, a WiMax network, WPAN, and/or a WLAN.

MS 110 may also receive signals from one or more Earth orbiting satellite vehicles (SVs) 180-1 or 180-2 (collectively referred to sometimes as SVs 180), which may be part of a satellite positioning system (SPS). SVs 180, for example, may be in a constellation of Global Navigation Satellite System (GNSS) such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

MS 110 may measure signals from SVs 180 and/or APs 120 associated with networks 130 and may obtain pseudo-range measurements for the satellites and RTT related measurements from APs 120. The pseudo-range measurements and/or RTT related measurements may be used to derive a position estimate for MS 110. Servers 150 may be used to provide location related information, such as assistance data, to MS 110, which may be used to assist in acquiring and measuring signals from SVs 180 and/or APs 120, and to derive position estimates from these measurements.

Additionally, mobile terminal 110 may provide location and/or signal related information, such as an estimated speed, an indication if the MS speed exceeds a speed threshold or threshold, an estimated position or location measurements (e.g., satellite measurements from one or more GNSSs, or network measurements such as RTT measurements from one or more APs 120, etc. to the servers 150. The term "speed" as used herein refers to the speed of MS 110 without regard to the direction of movement. In some embodiments, RTT measurements for mobile stations connected to an AP may be undertaken during periods when the speed of the mobile stations connected to that AP does not exceed some (speed) threshold and the RTT measurements collected may be used to estimate RTT variability associated with that AP. In some embodiments, RTT measurements between several APs and mobile stations meeting the threshold condition may be collected concurrently.

The location of MS 110 connected to networks 130 may be determined upon a request from the MS 110 (MS initiated), or at the request of another network entity (network initiated). For example, server 150-2 may initiate a positioning process to determine the location of MS 110 by requesting some subset of APs 120 to undertake and/or report measurements of one or more metrics related to MS 110.

In some embodiments, APs 120 may be managed using Wireless LAN Controller (WLC) 134. In some embodiments, programs or protocols on server 150-2 and/or WLC 134 may be used to manage, configure, and control APs 120. For example, WLC 130 may enforce policies related to Quality-of-Service (QoS), traffic shaping and/or bandwidth management. As another example, one or more program(s) or applications on server 150-2 and/or WLC 134 may request APs 120 or MS 110 to undertake metric measurements and/or obtain measured metric data from mobile station 110. In some embodiments, WLC 134 may include cellular network interfaces (e.g. WWAN cards) and/or wired network interfaces (e.g. Ethernet switches).

In situations, for example, where RTT measurements are taken and used when MS 110 is moving at a speed above some threshold, inaccuracies may result in location estimations for MS 110 computed based on those RTT measurements. Further variability may also result from differences in the characteristics of the chipsets of APs 120.

In some embodiments, systems and methods consistent with embodiments disclosed herein increase the reliability and accuracy of location estimates for MS 110 provided by an NBP system, in part, by increasing the number of RTT measurements taken when MS 110 is stationary, or when MS 110 is moving with a speed that does not exceed some threshold, which, in some instances, may be predetermined. Further, RTT measurements may be taken using several different mobile stations connected to the network at time when the individual speeds of the mobile stations do not exceed the threshold. In some embodiments, statistical techniques may be applied to the metrics collected from one or more of the mobile stations to determine and/or compensate for variations in RTT values that may arise, in part, from the characteristics of chipsets associated with APs 120. The techniques disclosed may also be applied using other (i.e. non-RTT) metrics. For example, as one application, the impact of AP chipset characteristics on the performance, accuracy and reliability of location estimates provided by the NBP system can be decreased.

Figure 1B:
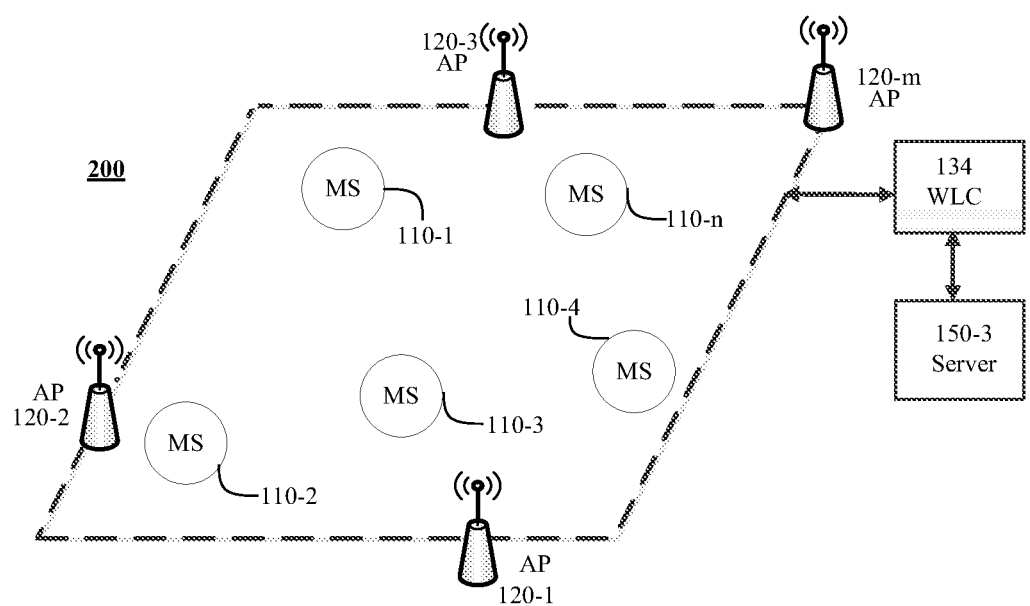
FIG. 1B shows an exemplary Network Based Positioning (NBP) system capable of providing Location Services to one or more mobile stations.

FIG. 1B shows an exemplary Network Based Positioning (NBP) system 200 capable of providing Location Services to one or more mobile stations 110-1-110-n (collectively sometimes referred to as mobile stations 110) and facilitating the exchange of capability information, location assistance data, and/or location related information. In some embodiments, NBP system 200 may use mobile station motion detection to obtain estimates of the variability of positioning related metrics for one or more APs 120. In some embodiments, system 200 may include server 150-3, Wireless LAN Controller ("WLC") 134, a network of Access Points (APs) 120-1-120-m (collectively sometimes referred to as APs 120). For example, NBP system 200 may be deployed in an indoor environment.

APs 120 may be managed using WLC 134. Each AP 120 may act as a transmitter and receiver of wireless network radio signals for the WLAN or WPAN. For example, a network administrator or network operations center may use WLC 134 in combination with server 150-3 to automatically configure APs 120 across the network. In some embodiments, WLC 134 may be used to discover, provision, and authenticate APs 120 in system 200, to set network policies and/or for network surveillance. For example, various protocols based on IEEE 802.11x family of standards such as Control and Provisioning of Access Points (CAPWAP) and/or other protocols such as Lightweight Access Point Protocol (LWAPP) may be installed on server 150-3 and used along with WLC 130 to control and configure multiple APs 120 in system 200.

In some embodiments, for example, when using IEEE 802.11 based protocols, the Media Access Control (MAC) address of the sender and receiver, protocol version, and other information pertaining to MS 110-i may be present in and/or obtained from MS 110-i (1≤i≤n) and/or in packets/frames transmitted between MS 110-i and APs 120. Frame types defined in the IEEE 802.11x family of protocols include data, control and management frames. For example, in some embodiments, management or control frames may be used by APs 120 to obtain information pertaining to a current configuration of MS 110-i.

Each MS 110 can be uniquely identified through its Media Access Control (MAC) address. The location of MS 110-i (1≤i≤n) connected to the network may be determined upon a request from the MS 110-i (MS initiated), or at the request of another network entity (network initiated), such as server 150-3, WLC 134, and/or AP 120-j (1≤j≤m). For example, MS 110-i may initiate a positioning process to determine its location by undertaking measurements of one or more metrics pertaining to some subset of APs 120-1 to 120-m. For example, the metrics measured by MS 110-i may include, without limitation, for example, RTT/RSSI values for one or more APs 120-j. In some embodiments, MS 110-i, server 150-3, and/or another network entity may also compute the position of MS 110-i through trilateration of the RTT measurements for multiple APs 120 and/or various other appropriate methods.

Typically, conventional NBP systems may use a variety of APs 120-j manufactured by various vendors. Thus, APs 120-j served by NBP system 200 may have a variety of Wi-Fi chipsets, which may exhibit different characteristics despite the fact that the served mobile stations 110-i and the APs 120-j may comply with the IEEE 802.11 or another relevant standard. In traditional NBP systems, these differences in chipset and other MS characteristics may affect the accuracy and/or reliability of the measured metrics and NBP mobile station location estimates that are based on those metrics.

In some embodiments, systems and methods consistent with embodiments disclosed herein increase the reliability and accuracy of location estimates for MS 110 provided by NBP system 200, in part, by increasing the number of RTT measurements taken when MS 110 is stationary, or when MS 110 is moving with a speed that does not exceed some threshold. In some embodiments, systems and methods may further estimate the variability of positioning related metrics for one or more APs 120-j in exemplary NBP system 200. For example, the variability of measured Round Trip Time (RTT) parameter values for an AP 120-j may be determined from measurements by MS 110-i. In some embodiments, for example, the estimated variability may be used, in part, to correct measured values of metrics associated with the one or more APs 120-j thereby increasing the reliability and accuracy of location estimates for MS 110. In some embodiments, the utilization of motion detection to estimate the variability of positioning related metrics for one or more APs 120-j may be performed in real time and using standard IEEE 802.11x frame exchanges. Accordingly, in one application, exemplary NBP system 200 may be able to achieve and maintain levels of performance, accuracy and reliability in location estimates by using motion detection to estimate the variability of positioning related metrics for one or more APs 120-j. System and methods disclosed herein permit a reduction of the impact of individual AP 120-j device characteristics on the performance, accuracy and reliability of location estimates provided by NBP system 200.

Figure 2A:
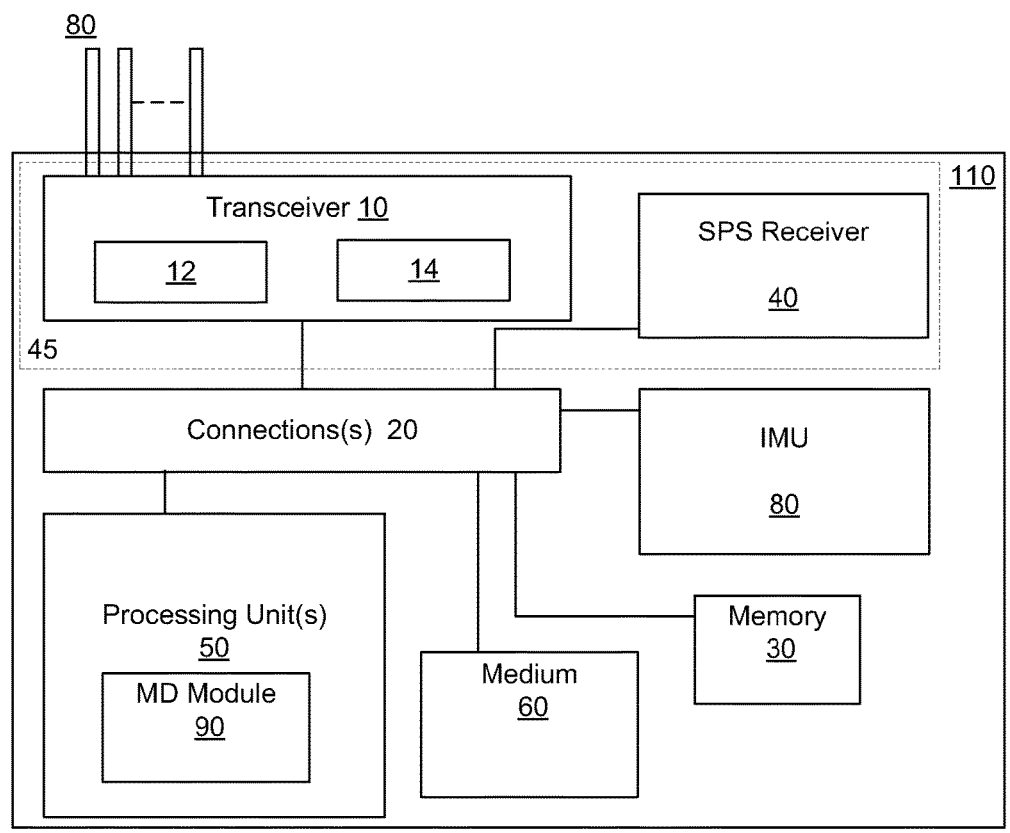
FIG. 2A shows a schematic block diagram illustrating certain exemplary features of an MS.

FIG. 2A shows a schematic block diagram illustrating certain exemplary features of MS 110. MS 110 may, for example, include various functional units such as one or more processing units 50, Inertial Measurement Unit (IMU) 80, memory 30, transceiver 10 (e.g., wireless network interface), transmitter 12, receiver 14, and (as applicable) an SPS receiver 40, and non-transitory computer-readable medium 60, which may comprise removable media in a removable media drive (not shown). The functional units in mobile device 110 may be operatively coupled through one or more connections 20 (e.g., buses, lines, fibers, links, etc.). In certain example implementations, all or part of MS 110 may take the form of a chipset, and/or the like.

In some embodiments, transceiver 10 (comprising transmitter 12 and receiver 14) and (as applicable) an SPS receiver 40 may be embodied within or form part of communications interface 45. In some embodiments, communications interface 45, transceiver 10 and/or SPS receiver 40 may comprise chipsets or other functional units that may be capable of undertaking measurements of signal parameters such as, but not limited to RTT and/or RSSI. In some embodiments, the functional units may be capable of RTT measurements in the order of nanoseconds.

In some embodiments, Satellite Positioning System (SPS) receiver 40, in mobile station 110, may be enabled to receive signals associated with one or more SPS resources. In some embodiments, the speed of MS 110 may be determined based on information received by SPS receiver 40 from one or more SPS systems.

In some embodiments, transceiver 10 may, for example, include a transmitter 12 enabled to transmit one or more signals over one or more types of wireless communication networks and a receiver 14 to receive one or more signals transmitted over the one or more types of wireless communication networks. For example, transmitter 12 and receiver 14 may be able to able to communicate with wireless networks including WLANs, WPANs, WWANs/cellular networks, femtocells, and various other types wireless communication networks.

In some embodiments, MS 110 may also comprise one or more antennas 80, which may be internal or external. Antennas 80 may be used to transmit and/or receive signals processed by transceiver 10 and/or SPS receiver 40. Antennas 80 may be used to transmit and/or receive signals processed by transceiver 10 and/or SPS receiver 40. In some embodiments, antennas 80 may be coupled to transceiver 10 and SPS receiver 40. In some embodiments, measurements of signals received (transmitted) by MS 110 may be performed at the point of connection of antennas 80 and transceiver 10. For example, the measurement point of reference for received (transmitted) RF signal measurements may be an input (output) terminal of the receiver 14 (transmitter 12) and an output (input) terminal of antennas 80. In systems using multiple antennas or antenna arrays 80, the antenna connector may be viewed as a virtual point representing the aggregate output (input) of multiple antennas 80.

Processing unit(s) 50 may be implemented using a combination of hardware, firmware, and software. Processing unit(s) 50 may be capable of receiving instructions/data from receiver 14 and/or retrieving instructions/data from memory 30 and may respond to the instructions and/or send data/results using transmitter 12. For example, the instructions received and/or retrieved may pertain to a portion of a process to undertake and/or report measured signal metrics associated with one or more APs 120. Processing unit 50 may also be capable of processing various other received information either directly or in conjunction with one or more other functional blocks shown in FIG. 1.

Processing unit(s) 50 may be implemented using a combination of hardware, firmware, and software. Processing unit(s) 50 may represent one or more circuits configurable to perform a portion of a computing procedure or process related to positioning metrics variability estimation and may retrieve instructions and/or data from memory 30. Processing unit(s) 50 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof. For a firmware and/or software implementation, the methodologies may be implemented with modules (e.g., procedures, functions, and so on) that perform the functions described herein.

In some embodiments, processing units 50 may also receive input from IMU 80. In some embodiments, IMU 80 may comprise 3 axis accelerometer(s), 3-axis gyroscope(s), and/or magnetometer(s). IMU 80 may provide speed, orientation, and/or other position related information to processing units 50. In some embodiments, the output of IMU 80 may be processed by Motion Detection (MD) module 90. For example, MD module 90 may provide an indication to processing unit(s) 50 when MS 110 is stationary. In some embodiments, MD module 90 may provide a "low speed" indication to processing unit(s) 50 or an application running on processing unit(s) 50, whenever MS 110 has a speed that does not exceed a threshold. The speed threshold or threshold may be configurable and/or predetermined based on system parameters for a wireless network such as NBP 200. Accordingly, if the threshold is set to zero, then, MD module 90 may provide an indication when MS 110 is stationary.

In some embodiments, MD module 90 may provide the low speed indication at regular intervals. In another embodiment, the low speed indicator may be updated upon a change in speed status of MS 110 relative to the threshold. In some embodiments, the estimated speed of MS 110, which may be based on the output of IMU 80 and/or other sensors on MS 110, may be provided along with a low speed indication. In another embodiment, MD module 90 may categorize the speed of MS 110 based on the output of IMU 80 into a one of several classes and provide an indication of speed class based on the current estimated speed of MS 110. In some embodiments, the frequency of metric measurement may be varied based on the current speed-class classification of MS 110.

In some embodiments, processing units 50 and/or an application running on processing units 50 may be configured to send a message to one or more of servers 150, whenever MD module 90 indicates an MS speed that is less than or equal to the threshold. The message sent to servers 150 may include the value of low speed indicator (e.g. "0" or "1") and/or the estimated speed of MS 110. In some embodiments, a message sent to server(s) 150 may include the estimated speed of MS 110 (based on the output of IMU 80), and servers 150 may determine whether reported speed exceeds some threshold speed. In some embodiments, the availability of an estimated speed and/or low speed indicator may be indicated to servers 150 as part of capability information for MS 110. In some embodiments, the estimated speed and/or low speed indicator may be sent to servers 150 in connection with a message requesting location assistance information, and/or in response to a request from one or more of servers 150. For example, for a single speed class, the low speed indicator may be provided as a single bit in a message to a server, with "1" indicating that the speed of MS 110 is not greater than the threshold; and a "0" indicating that the speed of MS 110 is above the threshold.

Memory 30 may be implemented within processing unit (s) 50 and/or external to processing unit(s) 50. As used herein the term "memory" refers to any type of long term, short term, volatile, nonvolatile, or other memory and is not to be limited to any particular type of memory or number of memories, or type of physical media upon which memory is stored. In some embodiments, memory 30 may hold code to facilitate the operation of mobile device 110, and other tasks performed by processing unit(s) 50. For example, memory 30 may hold data, saved mobile device states, current speed information, and code to report the speed indicator, current speed and/or a speed state change to servers 150. Memory 30 may also include information about one or more modes of operation, a current configuration of MS 110, configuration history, program results, etc.

In general, memory 30 may represent any data storage mechanism. Memory 30 may include, for example, a primary memory and/or a secondary memory. Primary memory may include, for example, a random access memory, read only memory, etc. While illustrated in FIG. 2 as being separate from processing unit(s) 50, it should be understood that all or part of a primary memory may be provided within or otherwise co-located and/or coupled to processing unit(s) 50.

Figure 2B:
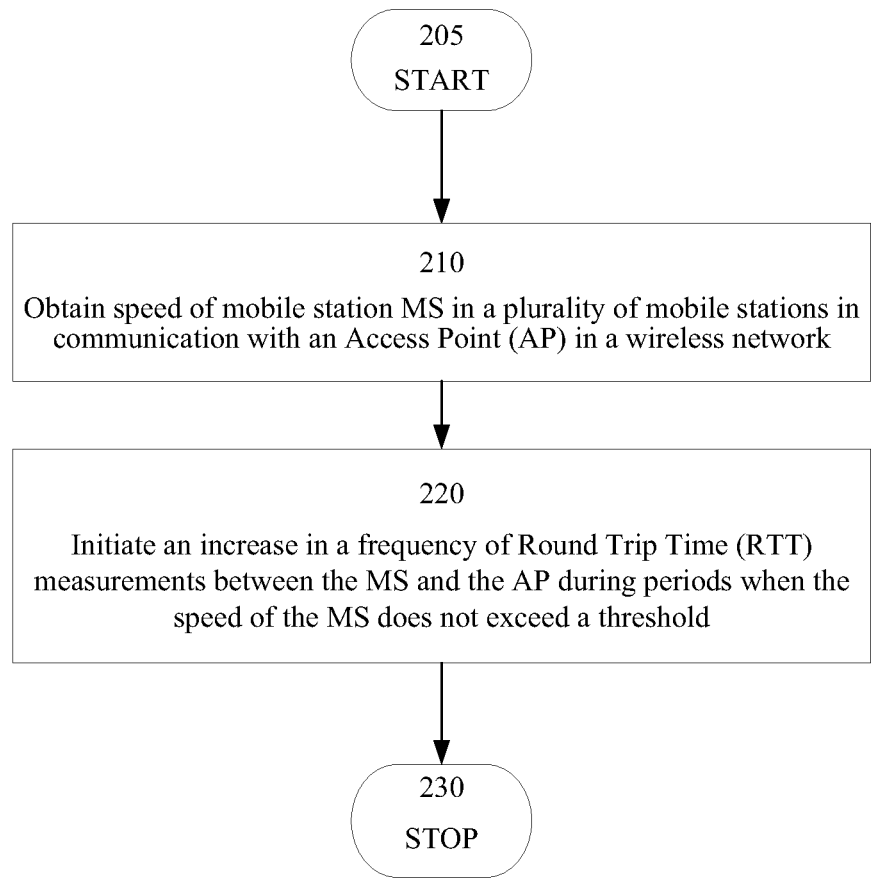
FIG. 2B shows a flowchart illustrating steps in an exemplary method for utilizing motion detection to vary the frequency of positioning related metric measurements.

FIG. 2B shows a flowchart illustrating steps in an exemplary method 200 for utilizing motion detection to vary the frequency of metric measurements. In some embodiments, method 200 may be performed by MS 110 or a server such as server 150-3.

In some embodiments, method 200 may start in step 205. Next in step 210, the speed of MS 110 in a plurality of mobile stations in communication with an AP 120 in a wireless network may be obtained.

In step 220, an increase in the frequency of Round Trip Time (RTT) measurements between the MS 110 and the AP 120 during periods when the speed of the MS does not exceed a threshold may be initiated. In some embodiments, the increased frequency of RTT measurements between the MS and the AP may be relative to one or more periods when the speed of the MS exceeds the threshold. In some embodiments, the threshold may be zero. In some embodiments, the speed of the MS may be obtained based on measurements by IMU 80 on the MS and/or information provided by SPS'. Further, in some embodiments, increased frequency of RTT measurements between MS 110 and AP 120 is initiated if a Received Signal Strength Indicator (RSSI) value associated with AP 120 and measured at the MS 110 is not less than a desired RSSI level. The method may terminate in step 230.

Figure 3A:
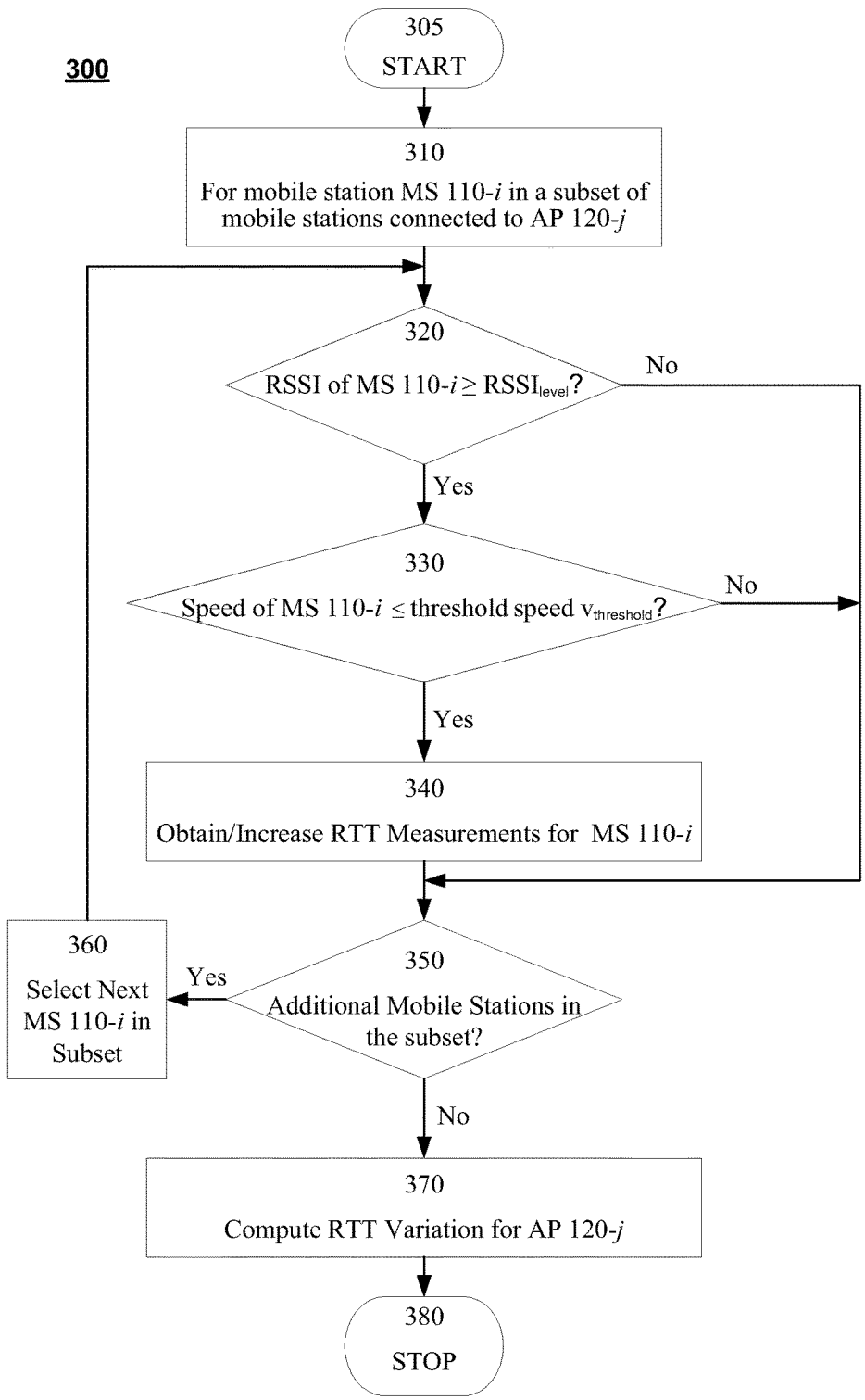
FIG. 3A shows a flowchart illustrating steps in an exemplary method for estimating RTT variability associated with an access point.

FIG. 3A shows a flowchart illustrating steps in an exemplary method 300 for estimating RTT variability associated with AP 120-j. In some embodiments, portions of method 300 may be implemented using program code on MS 110, servers 150 and/or another network entity in system 100. For example, a process running on servers 150 and/or another network entity may direct one or more MS' 110-i to perform one or more steps in method 300. In another embodiment, server 150 may perform method 300 by obtaining and processing a set of RTT measurements for one or more APs 120. In some embodiments, one or more steps in method 300 may be combined and/or omitted in a manner consistent with disclosed embodiments.

In some embodiments, method 300 may start in step 305 when one or more mobile stations connect to an AP (such as exemplary AP 120-j, $1 \le j \le m$) in the network. In some embodiments, method 300 may be run for a new AP 120-j when AP 120-j is added to the network and mobile stations connect to AP 120-j. In some embodiments, method 300 may be invoked upon request by a server for any AP 120-j that is currently serving one or more mobile stations 110. In some embodiments, method 300 may be performed concurrently for a plurality of APs in the network. In some embodiments, method 300 may be initiated when MS' 110 connect and/or reconnect with AP 120-j.

In step 310, mobile station MS 110-i, $1 \le i \le n$ may be selected from a subset comprising n mobile stations connected to exemplary AP 120-j.

In step 320, the RSSI, as determined by and/or reported to serving AP 120-j to which exemplary MS 110-i is connected, is compared to a desired RSSI level denoted as $RSSI_{level}$. In some embodiments, the desired RSSI level $RSSI_{level}$ may be set to a value that ensures accuracy of subsequent measurements. If the measured RSSI level is below the desired RSSI level $RSSI_{level}$ ("No" in step 320), then, the method may proceed to step 350, where the availability of other mobile stations in the subset may be determined In some embodiments, if the measured RSSI level associated with an AP 120-j is below $RSSI_{level}$ then, RTT measurements using MS 110-i can be deferred to a later time. For example, the RSSI level of MS 110-i may be monitored and periodically checked against $RSSI_{level}$ to determine if method 300 can be restarted. In some embodiments, $RSSI_{level}$ may be selected to ensure reliable RTT estimation for MS 110-i. If the measured RSSI level, as determined by and/or reported to serving AP 120-j to which exemplary MS 110-i is connected, is not less than $RSSI_{level}$ ("Yes" in step 320), then the method proceeds to step 330. In some embodiments, step 320 may be omitted and the method may proceed directly to step 330.

In step 330, the speed of MS 110-i may be obtained and compared to a threshold $v_{threshold}$. If the speed of MS 110-i is greater than $v_{threshold}$ ("No" in step 330), then, the method may proceed to step 350, where the availability of other mobile stations in the subset may be determined. In some embodiments, if the speed of MS 110-i exceeds $v_{threshold}$, then an increase in the frequency of RTT measurements using MS 110-i can be deferred to a later time. For example, the speed of MS 110-i may be monitored and periodically checked against the threshold speed level to determine if the frequency of measurements can be increased at a later point in time. For example, MS 110-i may be requested to report measured speed to serving AP 120-j at periodic intervals and the frequency of metric measurements increased when the measured speed of MS 110-i is not greater than $v_{threshold}$. In some embodiments, the speed threshold level may be selected to ensure accurate and/or reliable RTT estimation for exemplary MS 110-i. For example, if a stationary MS 110-i is desired, then $v_{threshold}$ may set to zero. In some embodiments, IMU 80 and/or other sensors on MS 110-i may be used to determine the speed of MS 110-i. In some embodiments, the speed of MS 110-i may be determined and/or reported by MS module 90.

In step 340, an increase in the frequency of RTT measurements for MS 110-i may be initiated and corresponding RTT measurements obtained. In some embodiments, the number of measurements collected in step 340 may be increased relative to other measurement periods. In some embodiments, the number of measurements collected may be higher than the number typically collected and/or used during the actual positioning of an exemplary MS 110-i. In some embodiments, the RTT measurements collected may be stored on one of servers 150 and associated with a tuple comprising an identifier (such as a timestamp) for the set of RTT measurements, an identifier (such as a MAC address) for AP 120-j, an identifier for MS 110-i (such as a MAC address and/or IMEI/IMSI/TMSI number), and/or an RTT estimated distance associated with the RTT measurements. In some embodiments, a set of RTT measurements undertaken for an MS 110-i in step 340 by an AP 120-j may be associated using a common timestamp for the set or another identifier. In some embodiments, the increased frequency of RTT measurements may be collected by AP 120-j from MS 110-i so long as the speed of MS 110-i does not exceed $v_{threshold}$. In some embodiments, some predetermined higher number of RTT measurements for MS 110-i may be taken in step 340 over some specified period so long as the speed of MS 110-i does not exceed $v_{threshold}$. In some embodiments, MS 110-i and/or AP 120-j may lower the frequency of RTT measurements, as the speed of MS 110-i increases. In some embodiments, RTT measurements may be stopped or the frequency of RTT measurements may be further lowered when the speed of MS 110-i exceeds $v_{threshold}$.

In step 350, the method may determine if there are additional mobile stations in the subset, for which RTT measurements have not yet been taken. If there are mobile stations in the subset for which no measurements have been undertaken ("Yes" in step 350), then the method proceeds to step 360, where the next/new mobile station is selected. The method then returns to step 320 to begin another iteration.

If there are no further mobile stations in the subset for AP to undertake measurements ("No" in step 350), then the method proceeds to step 370, where statistical techniques may be used to compute a measure of variability of the RTT measurements between MS 110-i and AP 120-j obtained in step 340. For example, a standard deviation, average absolute deviation, median absolute deviation, and/or variance of the RTT measurements obtained in step 340 may be obtained and associated with AP 120-j.

In some embodiments, RTT measurements obtained in step 340 may be categorized based on the RTT estimated distance between MS 110-i and AP 120-j. The RTT measurements for each distance category and may then be used in conjunction with prior RTT measurements for that distance category to obtain an overall standard deviation (across mobile stations) for all measurements for AP 120-j in a distance category.

In some embodiments, the RTT measurements for AP 120-j may be normalized based on the RTT estimated distance(s) and an overall standard deviation or another statistical measure of variability associated with AP 120-j may be obtained using the normalized RTT values. Because mobile stations may be located at different distances from the AP, normalization of the RTT values may be performed to obtain a common measure of variability across the RTT values measured by the diverse set of mobile stations. As used herein, normalization refers to the adjustment of RTT values measured at different distances to a notionally common distance. Accordingly, measured RTT values may be used to estimate a distance between the MS and AP and the RTT values may be scaled up or down to obtain normalized RTT values based on the normalization distance. For example, if a specific RTT measurement $RTT_{ij}$ between MS 110-i and/or AP 120-j was obtained at distance $D_{ij}$ and $D_N$ is the normalized distance, then normalized values $RTT_{Nij}$ may be computed as:

$$RTT_{Nij} = RTT_{ij} * \frac{D_N}{D_{ij}} \quad (1)$$

In some embodiments, by using a set of normalized RTT values for an AP 120-j, a measure of variability such as a variance, standard deviation, average absolute deviation, and/or median absolute deviation may be computed for AP 120-j.

In some embodiments, the RTT measurements obtained may be subjected to aging, and older RTT measurements may be discarded in favor of newer measurements and the RTT variability measures associated with AP 120-j may be updated. In some embodiments method 300 may be repeated for other APs 120 deployed on the network. The method may stop in step 380.

Figure 3B:
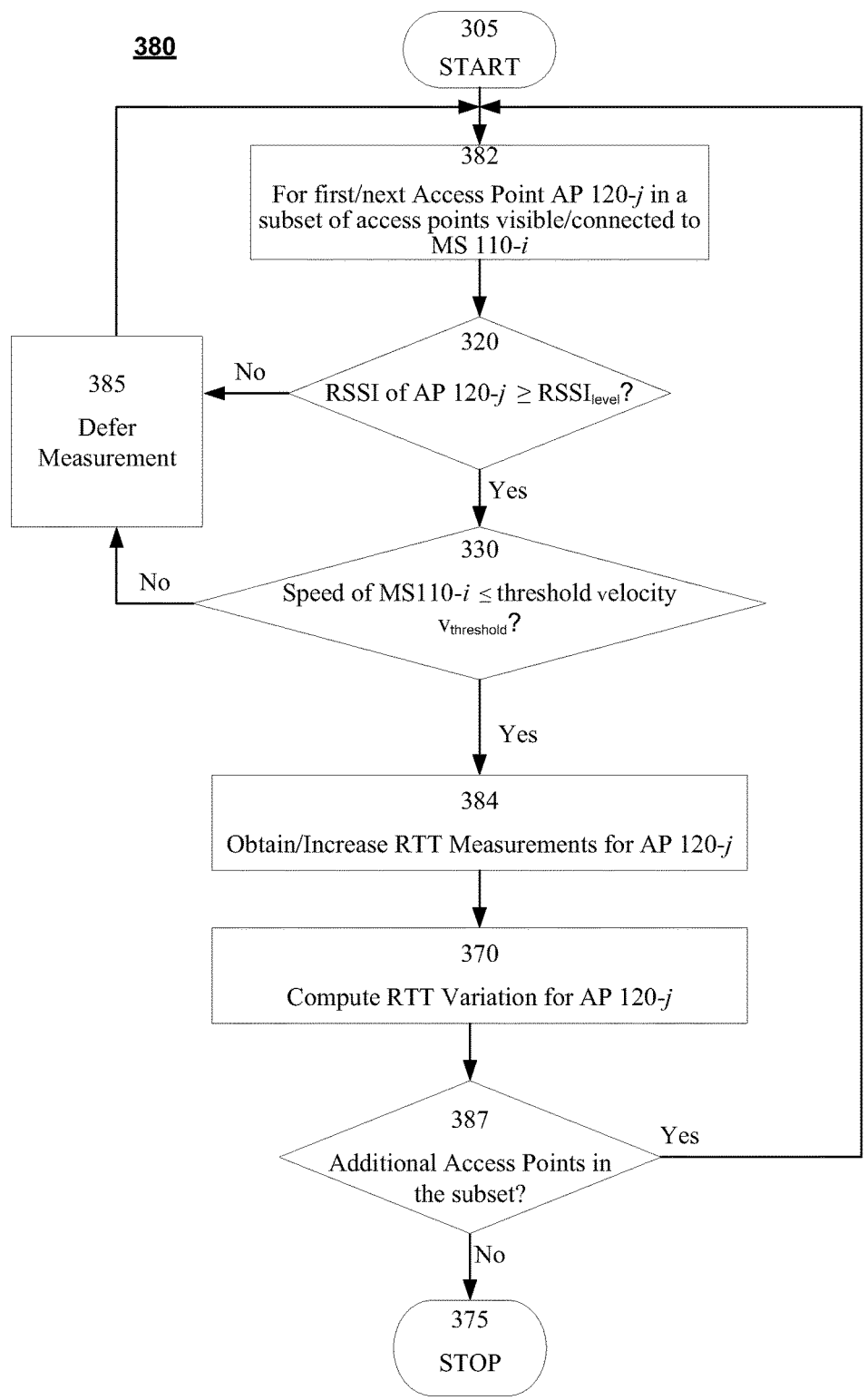
FIG. 3B shows a flowchart illustrating steps in an exemplary method for estimating RTT variability associated with an access point.

FIG. 3B shows a flowchart illustrating steps in an exemplary method 380 for estimating RTT variability associated with an access point. In one embodiment, one or more mobile stations connected to an access point may each perform method 380. In some embodiments, method 380 may be performed by mobile stations and/or a server. For example, in one embodiment, one or more mobile stations connected to an access point may measure RTT values and may report the measured RTT values and related information to a server, such as a crowdsourcing server, which may aggregate the measurements and apply statistical techniques to the measured values. In some embodiments, method 300 may be performed concurrently for several APs by different connected mobile stations concurrently. In some embodiments, mobile stations connected to an AP may concurrently perform method 300 and the process may occur concurrently with the performance of method 300 by other mobile stations connected to other APs in the network. In some embodiments, one or more steps in method 300 may be combined and/or omitted in a manner consistent with disclosed embodiments. Steps labeled with the same identifiers perform similar functions in methods 300 and 380.

For example, MS 110-i may be requested to report measured RSSI levels for serving AP 120-j at periodic intervals and the method may be restarted when the measured RSSI level is not less than $RSSI_{threshold}$.

In some embodiments, method 380 may start when a mobile station MS 110-i initially connects to a wireless network in step 305. In step 382, mobile station MS 110-i, 1≤i≤n may select the first or next AP 120-j 1≤j≤m from a subset comprising m access points connected to and/or visible to MS 110-i. For example, MS 110-i may select one of the connected APs or may connect to one of the visible APs.

Next, in step 310, the measured RSSI of serving AP 120-j, to which exemplary MS 110-i is connected, may be compared to a desired RSSI level denoted as $RSSI_{level}$. If the measured RSSI level is below $RSSI_{level}$ ("No" in step 320), then, in step 385, RTT measurement by MS 110-i may potentially be deferred to later point in time. For example, an application on MS 110-i may monitor and periodically check the measured RSSI of serving AP 120-j against $RSSI_{level}$ to determine if method 380 can be restarted. In some embodiments, if the measured RSSI level of the AP 120-j is not below the desired RSSI level $RSSI_{level}$ ("Yes" in step 320), then, the method may proceed to step 330.

In step 330, the speed of MS 110-i is compared to a threshold $v_{threshold}$. If the speed of MS 110-i is greater than $v_{threshold}$ ("No" in step 330), then, then, in step 385, increasing a frequency of RTT measurement(s) by MS 110-i may potentially be deferred to later point. For example, the speed of MS 110-i may be monitored and periodically checked against the threshold speed level to determine if the frequency of RTT measurements can be increased. For example, MS 110-i may be requested to report measured speed to serving AP 120-j at periodic intervals and the frequency of RTT measurements increased when the measured speed of MS 110-i is not greater than $v_{threshold}$. In some embodiments, IMU 80 and/or other sensors on MS 110-i may be used to determine the speed of MS 110-i. In some embodiments, the speed of MS 110-i may be determined and/or reported by MD module 90.

In step 330, if the speed of MS 110-i does not exceed $v_{threshold}$ ("Yes" in step 330), then, in step 384, the frequency of RTT measurements for AP 120-j may be increased. In some embodiments, the frequency of measurements collected may be increased in step 384, relative to the frequency of RTT measurements obtained during other periods. In some embodiments, the number of RTT measurements obtained in step 384 may be higher than the number typically collected and/or used during the actual positioning of an exemplary MS 110-i. In some embodiments, the RTT measurements collected may be stored on MS 110-i and associated with a tuple comprising an identifier for the set of RTT measurements (such as a timestamp), an identifier for AP 120-j (such as a MAC address), an identifier for MS 110-i (such as a MAC address and/or IMEI/IMSI/TMSI number), and/or an RTT estimated distance associated with the RTT measurements.

In some embodiments, a set of RTT measurements undertaken for an MS 110-i in step 384 by an AP 120-j during a measurement period may be associated using a common index (which may be a timestamp) or another identifier. In some embodiments, an increased frequency of RTT measurements between MS 110-i and AP 120-j may be maintained so long as the speed of MS 110-i does not exceed $v_{threshold}$. In some embodiments, some predetermined number of RTT measurements for may be taken over some period so long as the speed of MS 110-i does not exceed $v_{threshold}$. In some embodiments, MS 110-i may lower the measurement frequency and/or stop taking measurements, if the speed of MS 110-i exceeds $v_{threshold}$.

Next, in step 370, statistical techniques may be used to compute a measure of variability of the RTT measurements between MS 110-i and AP 120-j obtained in step 384. For example, a standard deviation, average absolute deviation, median absolute deviation, and/or variance of normalized RTT values (as obtained using equation 1 above) and based on the RTT measurements obtained in step 340, may be computed and associated with AP 120-j. In some embodiments, the measurements collected by distinct mobile stations may be sent to a server, such as a crowdsourcing server, which may aggregate and perform statistical analysis of the measured values to determine a measure of variability associated with measurements related to AP 120-j.

In step 387, if there are additional APs in the subset, then, the process may return to step 382 to select the next AP 120-j from the set of APs and begin another iteration.

Figure 4:
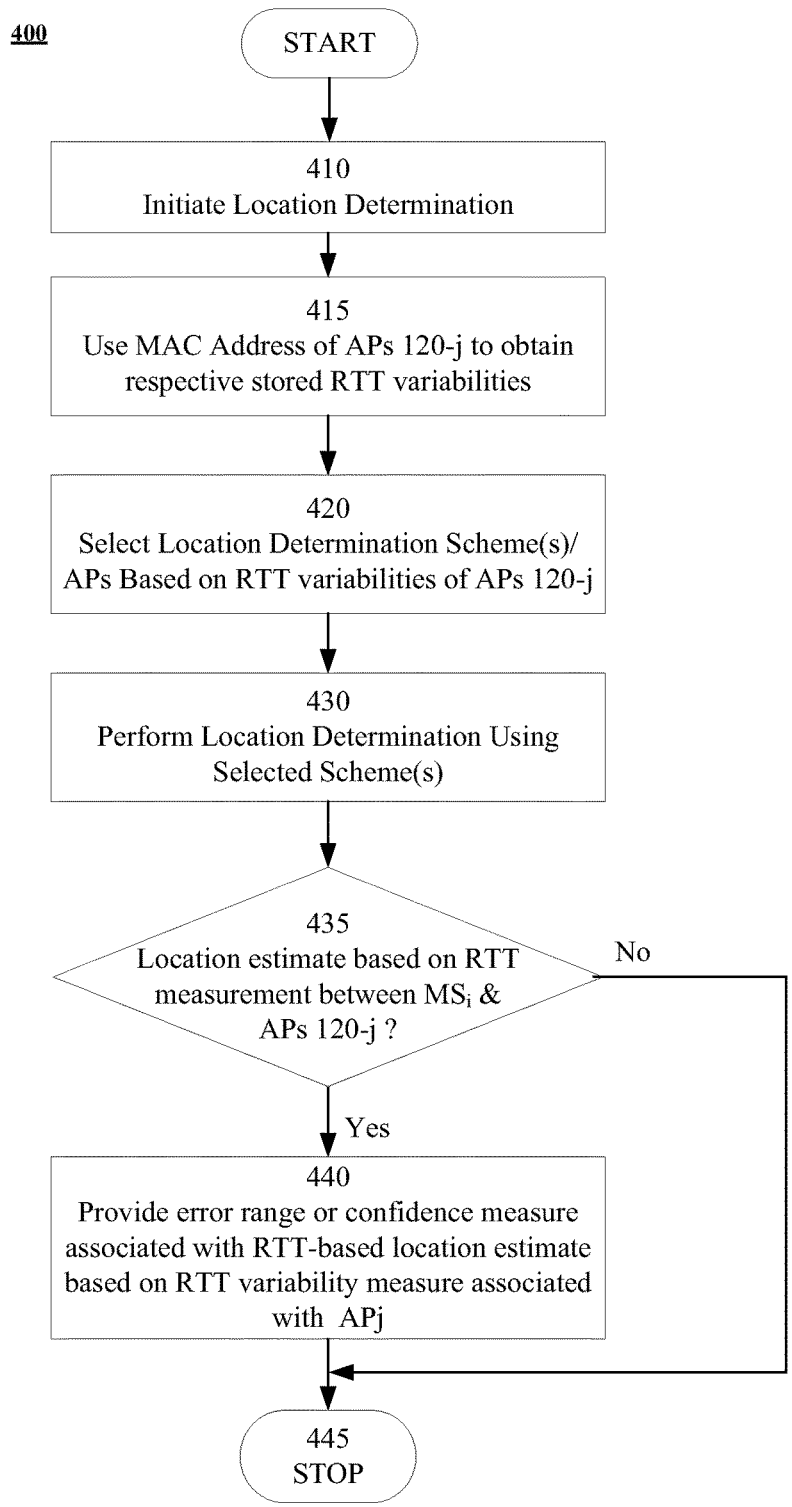
FIG. 4 shows a flowchart of an exemplary method for location determination of MS 110-i in a manner consistent with disclosed embodiments.

FIG. 4 shows a flowchart of an exemplary method for location determination of MS 110-i in a manner consistent with disclosed embodiments. In some embodiments, method 400 may start in step 410, when MS 110-i, AP 120-j, server 150, an LCS client and/or another network entity initiates a location determination process. In some embodiments, the MAC address or another identifier associated with APs 120-j that are available for location determination may be used to obtain the respective stored RTT variabilities information.

In step 420, a location determination scheme or APs may be selected based on the respective stored RTT variabilities information. For example, if the RTT variability information indicates that RTT variability for a specific AP 120-j is high, then, then that AP 120-j may not be selected for use in location determination, if alternate APs are available. In some embodiments, APs 120-j with the lowest RTT variability that are available/visible to MS 110-i may be selected for location determination. In another embodiment, an alternate (non-RTT) scheme may be used in the event that RTT variability is high. In a further embodiment, the number of RTT measurements taken for an AP 120-j may be based, in part, on the RTT variability information associated with that AP 120-j. For example, a lower number of RTT measurements may be taken if RTT variability for an AP 120-j is low, while a greater number of RTT measurements may be taken if RTT variability for an AP 120-j is high.

In step 430, location determination may be performed based on the scheme selected in step 430. In step 435, the method may determine if RTT measurements were used to determine the location of MS 110-i. If an RTT based location determination scheme was used in step 430 ("Y" in step 435) then, in step 440, an error range or confidence measure associated with the RTT-based location estimate may be provided. The error range and/or confidence measure may be based, in part, on the respective RTT variability measures associated with APs 120-j that were used for location determination in step 430. If an alternate (non-RTT based) scheme was used for location determination in step 430 ("No" in step 435), then, the method may terminate in step 445.

Figure 5:
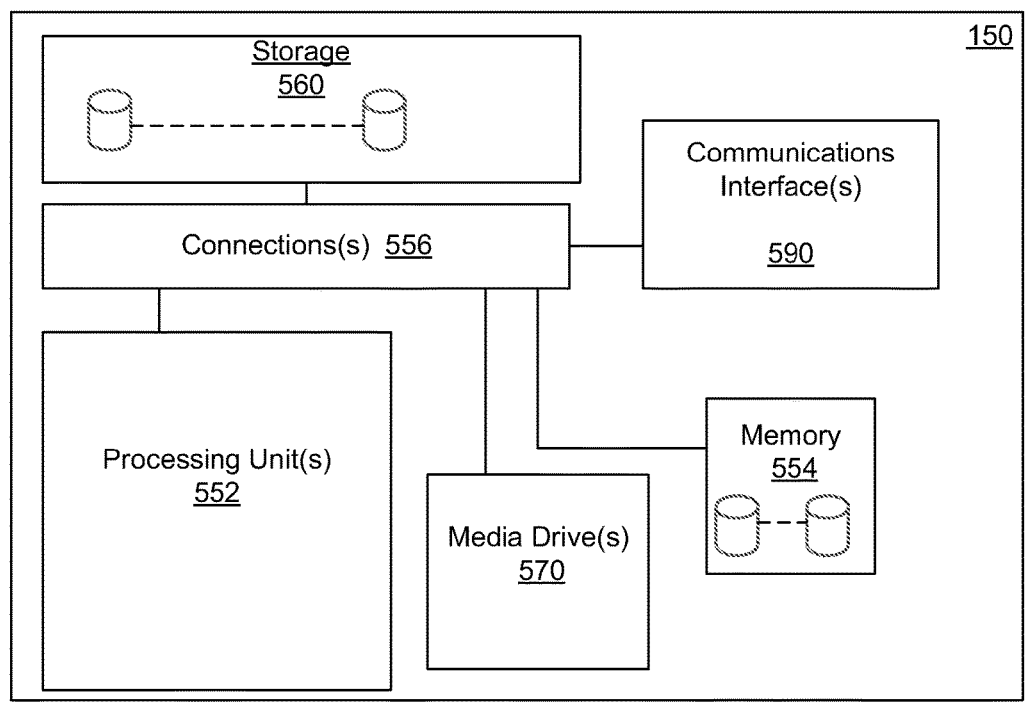
FIG. 5 shows a schematic block diagram illustrating an exemplary server enabled to estimate RTT variability associated with an access point in a manner consistent with disclosed embodiments.

FIG. 5 shows a schematic block diagram illustrating exemplary server 150 enabled to estimate RTT variability associated with an access point in a manner consistent with disclosed embodiments. In some embodiments, server 150 may include, for example, one or more processing units 552, memory 554, storage 560, and (as applicable) communications interfaces 590 (e.g., wireline and/or wireless network interfaces). The functional units listed above as well as other functional units may be operatively coupled with one or more connections 556 (e.g., buses, lines, fibers, links, etc.). In certain example implementations, some portion of server 150 may take the form of a chipset, and/or the like.

Communications interfaces 590 may include a variety of wired and/or wireless connections that support wired transmission and/or reception and, if desired, may additionally or alternatively support transmission and reception of one or more signals over one or more types of wireless communication networks. Communications interfaces 590 may also include interfaces for communication with various other computers and peripherals. For example, in one embodiment, communications interfaces 590 may comprise network interface cards, input-output cards, chips and/or ASICs that implement one or more of the communication functions performed by server 150. In some embodiments, communications interface(s) 590 may also interface with WLC 134 or another network entity to obtain a variety of network configuration related information, such as connected devices, device configuration information, MAC addresses of connected devices, etc. In some embodiments, server 150 may also use communications interfaces 590 to direct WLC 134 to configure APs 120 to perform portions of a method for estimating RTT variability associated with an access point, or to enforce network policies. Further, server 150 may receive MS related information including values of measured parameters from WLC 134 through communications interfaces 590. In general, communications interfaces 590 may be used to send and receive data, control, management, and configuration information related to NBP system 200 to various network entities.

Processing unit(s) 552 may be implemented using a combination of hardware, firmware, and software. In some embodiments, processing unit 552 may also optionally include an AP characterization module, location determination module and/or a location assistance module (not shown) to facilitate estimation of RTT variability associated with one or more access points 120, determine the location of MS 110, and/or to provide location assistance information, respectively. For example, if location determination is being performed by another network entity, server 140 may provide RTT variability information associated with one or more access points 120 as location assistance information. In one embodiment, server 150 may use processing units 552 to implement methods 300 and 400. In some embodiments, the functionality in exemplary methods 300 and 400 may be combined in to a single module. Processing unit 552 may also be capable of processing various other types of network related, location related and/or AP characterization related information either directly or in conjunction with one or more other functional blocks shown in FIG. 5.

The methodologies described herein in flow charts and message flows may be implemented by various means depending upon the application. For example, these methodologies may be implemented in hardware, firmware, software, or any combination thereof. For a hardware implementation, the processing unit 552 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software may be stored in media drive 570, which may support the use of non-transitory computer-readable media, including removable media. Program code may be resident on non-transitory computer readable media or memory 554 and may be read and executed by processor unit(s) 552. Memory may be implemented within processing units 552 or external to processing units 552. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium and/or memory 554. Examples include computer-readable media encoded with a data structure and computer-readable media encoded with a computer program. For example, non transitory computer-readable medium including program code stored thereon may include program code to support motion detection, AP characterization, location determination and/or location assistance of MS 110 in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interfaces 590, which may store the instructions/data in memory 554, storage 560 and/or relay the instructions/data to processing units 552 for execution. For example, communications interfaces 590 may receive wireless or network signals indicative of instructions and data. The instructions and data may cause one or more processing units 552 to be configured to implement one or more functions outlined in the claims. That is, the communication apparatus includes transmission media with signals indicative of information to perform disclosed functions.

Memory 554 may represent any data storage mechanism. Memory 554 may include, for example, a primary memory and/or a secondary memory. Primary memory may include, for example, a random access memory, read only memory, nonvolatile RAM, etc. While illustrated in this example as being separate from processing units 552, it should be understood that all or part of a primary memory may be provided within or otherwise co-located/coupled with processing units 552. Secondary memory may include, for example, the same or similar type of memory as primary memory and/or storage 560 such as one or more data storage devices or systems 560 including, for example, hard disk drives, optical disc drives, tape drives, a solid state memory drive, etc. In some embodiments, storage 560 and/or memory 554 may comprise one or more databases that may hold information pertaining to various entities in NBP system 200. For example, storage 560 and/or memory 554 may include databases such as AP characterization databases with records for APs 120 in NBP system 200.

In some embodiments, the AP characterization databases may identify APs 120 by their MAC addresses and hold an AP characterization record for each MAC address. An AP characterization record for an AP 120-j may comprise the MAC address of AP 120-j and RTT variability information associated with AP 120-j, classification group of AP 120-j, where the classification is made based on the RTT variability. For example, in one embodiment, the APs may be classified based on the RTT measurements as consistent, moderately variable, or unreliable. In addition, the characterization record may comprise the RTT variability measure, the individual RTT measurement records, and other information. In some embodiments, information in the databases may be read, used and/or updated by processing units 552 during various computations.

In certain implementations, secondary memory may be operatively receptive of, or otherwise configurable to couple to a non-transitory computer-readable medium in media drive 570. As such, in certain example implementations, the methods and/or apparatuses presented herein may take the form in whole or part of a media drive 570 that may include non-transitory computer readable medium with computer implementable instructions stored thereon, which if executed by at least one processing unit 352 may be operatively enabled to perform all or portions of the example operations as described herein.

The methodologies described herein may be implemented by various means depending upon the application. For example, the methodologies may be implemented in hardware, firmware, software, or any combination thereof. Various adaptations and modifications may be made without departing from the scope. Therefore, the spirit and scope of the following claims should not be limited to the foregoing description.

What is claimed is:

1. A processor-implemented method comprising:
   determining a motion associated with a Mobile Station (MS) in communication with an Access Point (AP) in a wireless network;
   maintaining a frequency of Round Trip Time (RTT) measurements between the MS and the AP when the MS is stationary; and
   in response to a determination that the motion associated with the MS exceeds a threshold, initiating a decrease in the frequency of RTT measurements between the MS and the AP.

2. The processor-implemented method of claim 1, wherein maintaining the frequency of RTT measurements between the MS and the AP comprises:
   obtaining a plurality of RTT measurements between the MS and the AP.

3. The processor-implemented method of claim 2, further comprising:
   determining an RTT variability associated with the plurality of RTT measurements.

4. The processor-implemented method of claim 3, wherein the RTT variability is computed as at least one of:
   a standard deviation of the plurality of RTT measurements, or
   an average absolute deviation of the plurality of RTT measurements, or
   a median absolute deviation of the plurality of RTT measurements.

5. The processor-implemented method of claim 2, further comprising:
   normalizing the plurality of RTT measurements to derive a corresponding plurality of normalized RTT measurements.

6. The processor-implemented method of claim 5, further comprising:
   determining a first RTT variability associated with the plurality of normalized RTT measurements;
   aggregating the plurality of normalized RTT measurements with previously stored normalized RTT measurements associated with the AP; and
   determining a second RTT variability based on the aggregated normalized RTT measurements.

7. The processor-implemented method of claim 1, wherein the decrease in the frequency of RTT measurements between the MS and the AP is relative to a period during which the motion of the MS does not exceed the threshold.

8. The processor-implemented method of claim 1, wherein the threshold is zero.

9. The processor-implemented method of claim 1, wherein the motion of the MS is obtained based on measurements by an Inertial Management Unit (IMU) on the MS.

10. The processor-implemented method of claim 1, wherein maintaining the frequency of RTT measurements between the MS and the AP comprises:
    determining that a Received Signal Strength Indicator (RSSI) value associated with the AP and measured at the MS is not less than a desired RSSI level; and
    in response to the determination that the RSSI value is not less than the desired RSSI level, maintaining the frequency of RTT measurements between the MS and the AP.

11. The processor-implemented method of claim 1, wherein the method is performed by one of:
    the MS; or
    the AP; or
    a server communicatively coupled to the AP; or
    a combination thereof.

12. The method of claim 1, further comprising:
    in response to a determination that the motion associated with the MS does not exceed the threshold, determining an RTT reliability classification of the AP, the RTT reliability classification being determined based on a variability of a plurality of RTT measurements between the MS and the AP.

13. An apparatus comprising:
    a memory, and
    a processor coupled to the memory, wherein the processor is configured to:
      determine a motion associated with a Mobile Station (MS) in communication with an Access Point (AP) in a wireless network;
      maintain a frequency of Round Trip Time (RTT) measurements between the MS and the AP when the MS is stationary; and
      in response to a determination that the motion associated with the MS exceeds a threshold, initiate a decrease in the frequency of RTT measurements between the MS and the AP.

14. The apparatus of claim 13, wherein to maintain the frequency of RTT measurements between the MS and the AP, the processor is configured to:
    obtain a plurality of RTT measurements between the MS and the AP.

15. The apparatus of claim 14, wherein the processor is further configured to determine an RTT variability associated with the plurality of RTT measurements.

16. The apparatus of claim 15, wherein the processor is configured to determine the RTT variability based on at least one of:
    a standard deviation of the plurality of RTT measurements, or
    an average absolute deviation of the plurality of RTT measurements, or
    a median absolute deviation of the plurality of RTT measurements.

17. The apparatus of claim 14, wherein the processor is further configured to:
    normalize the plurality of RTT measurements to derive a corresponding plurality of normalized RTT measurements.

18. The apparatus of claim 17, wherein:
    the memory is configured to store a plurality of prior normalized RTT measurements associated with the AP; and
    the processor is further configured to:
    determine a first RTT variability associated with the plurality of normalized RTT measurements;
    aggregate the plurality of normalized RTT measurements with the stored prior normalized RTT measurements associated with the AP; and
    determine a second RTT variability based on the aggregated normalized RTT measurements.

19. The apparatus of claim 13, wherein the decrease in the frequency of RTT measurements between the MS and the AP is relative to a period when the motion of the MS does not exceed the threshold.

20. The apparatus of claim 13, wherein the threshold is zero.

21. The apparatus of claim 13, wherein to maintain the frequency of RTT measurements between the MS and the AP, the processor is configured to:
   determine that a Received Signal Strength Indicator (RSSI) value associated with the AP and measured at the MS is not less than a desired RSSI level; and
   in response to the determination that the RSSI value is not less than the desired RSSI level, maintain the frequency of RTT measurements between the MS and the AP.

22. The apparatus of claim 13, wherein, in response to a determination that the motion associated with the MS does not exceed the threshold, the processor is further configured to:
   determine an RTT reliability classification of the AP, the RTT reliability classification being determined based on a variability of a plurality of RTT measurements between the MS and the AP.

23. An apparatus comprising:
   means for determining a motion associated with a Mobile Station (MS) in communication with an Access Point (AP) in a wireless network;
   means for maintaining a frequency of Round Trip Time (RTT) measurements between the MS and the AP when the MS is stationary; and
   in response to a determination that the motion associated with the MS exceeds a threshold, means for initiating a decrease in the frequency of RTT measurements between the MS and the AP.

24. The apparatus of claim 23, wherein means for maintaining the frequency of RTT measurements between the MS and the AP comprises:
   means for obtaining a plurality of RTT measurements between the MS and the AP.

25. The apparatus of claim 24, further comprising:
   means for determining an RTT variability associated with the plurality of RTT measurements.

26. The apparatus of claim 25, wherein the RTT variability is determined as at least one of:
   a standard deviation of the plurality of RTT measurements, or
   an average absolute deviation of the plurality of RTT measurements, or
   a median absolute deviation of the plurality of RTT measurements.

27. The apparatus of claim 23, wherein the decrease in the frequency of RTT measurements between the MS and the AP is relative to a period when the motion of the MS does not exceed the threshold.

28. A non-transitory computer-readable medium comprising instructions executable by a processor to:
   determine a motion associated with a Mobile Station (MS) in communication with an Access Point (AP) in a wireless network;
   maintain a frequency of Round Trip Time (RTT) measurements between the MS and the AP when the MS is stationary; and
   in response to a determination that the motion associated with the MS exceeds a threshold, initiate a decrease in the frequency of RTT measurements between the MS and the AP.

29. The computer-readable medium of claim 28, wherein the instructions to maintain the frequency RTT measurements between the MS and the AP, comprise instructions executable by the processor to:
   obtain a plurality of RTT measurements between the MS and the AP.

30. The computer-readable medium of claim 29, further comprising instructions executable by the processor to:
   determine an RTT variability associated with the plurality of RTT measurements.

31. The computer-readable medium of claim 30, wherein the RTT variability is computed as at least one of:
   a standard deviation of the plurality of RTT measurements, or
   an average absolute deviation of the plurality of RTT measurements, or
   a median absolute deviation of the plurality of RTT measurements.

32. The computer-readable medium of claim 28, wherein the threshold is zero.

* * * * *